United States Patent
Mao et al.

(10) Patent No.: US 10,633,576 B2
(45) Date of Patent: Apr. 28, 2020

(54) ULTRA-HIGH TEMPERATURE FRACTURING FLUID

(71) Applicant: Southwest Petroleum University, Chengdu (CN)

(72) Inventors: Jincheng Mao, Chengdu (CN); Yang Zhang, Xianyang (CN); Jinzhou Zhao, Chengdu (CN); Xiaojiang Yang, Chongzhou (CN); Heng Zhang, Chongzhou (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 116 days.

(21) Appl. No.: 16/071,081

(22) PCT Filed: Feb. 9, 2018

(86) PCT No.: PCT/CN2018/076070
§ 371 (c)(1),
(2) Date: Jul. 19, 2018

(87) PCT Pub. No.: WO2019/144442
PCT Pub. Date: Aug. 1, 2019

(65) Prior Publication Data
US 2020/0063020 A1 Feb. 27, 2020

(30) Foreign Application Priority Data
Jan. 24, 2018 (CN) .......................... 2018 1 0068993

(51) Int. Cl.
*C09K 8/68* (2006.01)
*C09K 8/88* (2006.01)
*E21B 43/26* (2006.01)

(52) U.S. Cl.
CPC .............. *C09K 8/685* (2013.01); *C09K 8/882* (2013.01); *C09K 8/887* (2013.01); *E21B 43/26* (2013.01); *C09K 2208/26* (2013.01)

(58) Field of Classification Search
None
See application file for complete search history.

(56) References Cited

U.S. PATENT DOCUMENTS

2009/0221453 A1* 9/2009 Mukhopadhyay ....... C09K 8/68
507/202

FOREIGN PATENT DOCUMENTS

CN 104232071 A 12/2014
CN 105885817 A 8/2016
(Continued)

*Primary Examiner* — Andrew Sue-Ako
(74) *Attorney, Agent, or Firm* — Bayramoglu Law Offices LLC

(57) ABSTRACT

An ultra-high temperature fracturing fluid, including the following components in mass percentages: 0.4 wt %-0.8 wt % of a polymer thickener, 0.015 wt %-0.02 wt % of a non-metallic crosslinking agent, 0.04 wt %-0.06 wt % of a gel breaker and the rest is water. The polymer thickener is obtained by a polymerization of acrylamide, acrylic acid, 2-acrylamido-2-methylpropanesulfonic acid, rigid monomer and cationic hydrophobic monomer in a weight ratio of 55-70:15-20:15-20:0.5-3:0.1-1.0, the polymerization temperature is 30-40° C. and the polymerization time is 8-10 hours. The fracturing fluid of the present invention can effectively solve the technical problems that traditional fracturing fluids are easily decomposed at high temperatures and affect performance.

11 Claims, 4 Drawing Sheets

(56) References Cited

FOREIGN PATENT DOCUMENTS

| | | |
|---|---|---|
| CN | 106467736 A | 3/2017 |
| CN | 106590612 A | 4/2017 |
| WO | 2015113577 A1 | 8/2015 |

* cited by examiner

ULTRA-HIGH TEMPERATURE FRACTURING FLUID

CROSS REFERENCE TO RELATED APPLICATIONS

This application is the national phase entry of International Application No. PCT/CN2018/076070, filed on Feb. 9, 2018, which is based upon and claims priority to Chinese Patent Application No. 201810068993.4, filed on Jan. 24, 2018, the entire contents of which are incorporated herein by reference.

TECHNICAL FIELD

The present invention relates to the technical field of oil and gas field development, and specifically relates to an ultra-high temperature fracturing fluid.

BACKGROUND

As the world's demand for energy has increased, and the advances have achieved in exploration technology. In recent years, exploration and development of oil and gas resources have experienced accelerated development. Increasingly, major exploration target layers are deeper and harder to reach. The number of abnormally high temperature deep wells with well depths greater than 4500 m and temperatures exceeding 170° C. is on the rise. The depths of some oil wells even exceed 7000 meters with temperatures reaching 200° C. Higher temperatures and deeper well depths raise a higher requirement on the temperature-resisting and shear-resistance properties of the fracturing fluid system, requiring the fracturing fluid to maintain good rheological properties and sand carrying capacity at a reservoir temperature of 200° C. or temperatures exceeding 220° C. However, conventional organic boron cross-linked fracturing fluid is only suitable for temperatures of up to 150° C., and the conventional organic boron-cross linked fracturing fluid is unable to maintain good performance at temperatures exceeding 180° C. The long-chain of guar gum macromolecules which is a common vegetable gum thickening agent, rapidly degrades when temperatures reach 177° C. The cross-linked structure of the vegetable gum fracturing fluid is hydrolyzed when the pH of the system is low, and the hydrolyzation is especially severe at high temperatures. Therefore, considering the increasing demand in the oil fields for an ultra-high temperature fracturing fluid, and aiming at the fracturing stimulation of low-permeability ultra-high wells, it is of great significance to develop a high temperature polymer fracturing fluid system with a maximum operating temperature of 200° C. or even exceeding 220° C.

SUMMARY

In view of the above prior art, the present invention provides an ultra-high temperature fracturing fluid to solve the technical problem that conventional fracturing fluids can easily decompose at high temperatures and affect performance.

To achieve the above objective, the technical solution adopted by the present invention is to provide an ultra-high temperature fracturing fluid, including the following components in mass percentage: 0.4 wt %-0.8 wt % of a polymer thickener, 0.015 wt %-0.02 wt % of a non-metallic cross-linking agent, 0.04 wt %-0.06 wt % of a gel breaker, and the rest of water.

The polymer thickener is obtained by polymerization of acrylamide, acrylic acid, 2-acrylamido-2-methylpropanesulfonic acid, rigid monomer and cationic hydrophobic monomer in a weight ratio of 55-70:15-20:15-20:0.5-3:0.1-1.0.

Based on the above technical solutions, the present invention can also be improved as follows:

Further, the ultra-high temperature fracturing fluid includes the following components in mass percentage: 0.6 wt % of polymeric thickener, 0.015 wt % of non-metallic crosslinking agent, 0.04 wt % of gel breaker, and the rest of water.

Further, the non-metallic crosslinking agent is polyethyleneimine.

Further, the gel breaker is ammonium persulfate capsules and/or ammonium persulfate.

Further, the rigid monomer is N-vinyl-2-pyrrolidone and/or sodium p-styrenesulfonate.

Further, the cationic hydrophobic monomer is at least one of dimethyldiallylammonium chloride, [2-(methacryloyloxy)ethyl]trimethylammonium chloride, and dimethyl octadecyl allyl ammonium chloride.

Further, the polymer thickener is prepared as follows:

Mixing acrylamide, acrylic acid, 2-acrylamide-2-methylpropanesulfonic acid, rigid monomers and cationic hydrophobic monomers, polymerizing at a temperature of 30-40° C. for 8-10 hours to obtain a copolymer, crushing and drying the copolymer, and finally pulverizing copolymer to obtain the polymer thickener.

The beneficial effects of the present invention are:

1. Hydrogen bonds, electrostatic bridges, associations, etc. of the fracturing fluid can be destroyed at high temperatures, and the fracturing fluid's performance is seriously affected. Although the hydrogen bonds, electrostatic bridges, associations, etc. of the fracture fluid in this present invention may also be destroyed at high temperatures, corresponding reaction(s) will be performed between each component of the fracturing fluid to form a more stable covalent bond under the double actions of hydrolysis and pyrolysis at the same time, so that the system itself will be repaired and the performance of the fracturing fluid will not be affected.

2. The fracturing fluid of the present invention has a maximum shearing temperature of 220° C. at 170 s$^{-1}$, a maximum shearing temperature of 260° C. at 100 s$^{-1}$, and can maintain its performance at high temperatures, which is an ideal ultra-high temperature fracturing fluid.

3. The preparation method of the polymer thickener is easy to operate, low in cost, and has a broad market potential.

BRIEF DESCRIPTION OF THE DRAWINGS

To explain the embodiments of the present invention or the technical solutions in the prior art more clearly, the drawings will be briefly described below. Obviously, the drawings in the following description are just some embodiments of the present invention. For those skilled in the art, other drawings may also be obtained based on these drawings without any inventive concepts.

DETAILED DESCRIPTION

The specific embodiments of the present invention will be described in detail below with the accompanying drawings.

Embodiment 1

In this embodiment, five monomers of acrylamide, acrylic acid, 2-acrylamido-2-methylpropanesulfonic acid, N-vinyl-2-pyrrolidone and dimethyloctadecyl allyl ammonium chloride were polymerized in a weight ratio of 60:20:18:1.5:0.1 at 30° C. for 10 hours to obtain a copolymer, the copolymer was crushed, then dried at 40° C., and finally pulverized to 250 mesh to obtain a polymer thickener powder. The polymer thickener was prepared into a solution with weight percentage of 0.4 wt %, and 0.015 wt % of polyethyleneimine and 0.04 wt % of ammonium persulfate were added to the solution to obtain the fracturing fluid after thorough stirring.

Figure 1:
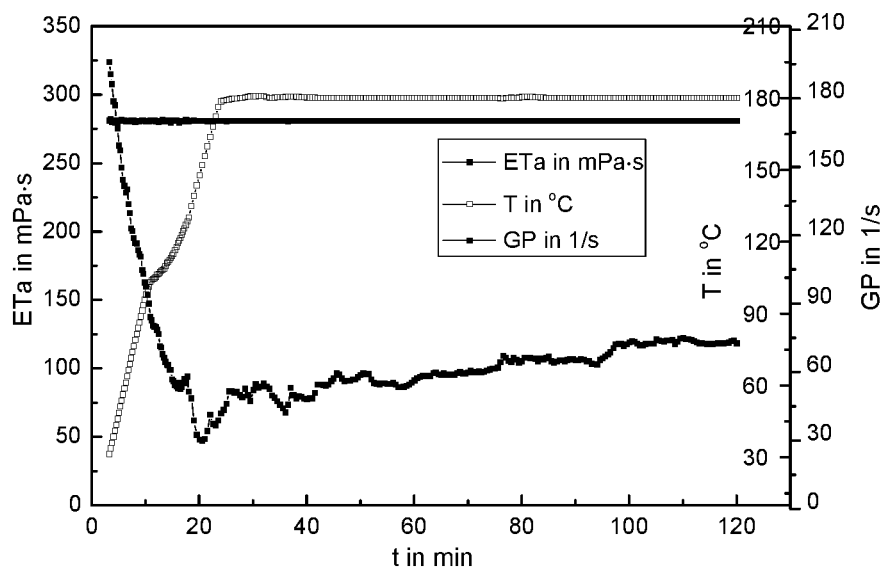
FIG. 1 is a variation curve of the apparent viscosity of the ultra-high temperature fracturing fluid system vs time at 170 s$^{-1}$ and 180° C.

The variation curve of the apparent viscosity of the ultra-high temperature fracturing fluid system over time was tested at 170 s$^{-1}$ and 180° C., as shown in FIG. 1. It can be seen from FIG. 1, the apparent viscosity of the high temperature fracturing fluid decreases sharply when the temperature increases. When it reaches 180° C., the viscosity is 51 mPa·s, after which, the viscosity rises slowly. Shear continues to be performed to 120 minutes at 180° C., and the viscosity of the high temperature fracturing fluid rises gradually, and the viscosity of the solution reaches 100 mPa·s, indicating that the ultra-high temperature fracturing fluid of the present invention is self-healed, thereby increasing the viscosity of the fracturing fluid system.

Embodiment 2

In this embodiment, five monomers of acrylamide, acrylic acid, 2-acrylamido-2-methylpropanesulfonic acid, N-vinyl-2-pyrrolidone and dimethyloctadecyl allyl ammonium chloride were polymerized in a weight ratio of 65:20:15:2.0:0.5 at 35° C. for 10 hours to obtain a copolymer, the copolymer was crushed, and then dried at 40° C., and finally pulverized to 250 mesh to obtain a polymer thickener powder. The polymer thickener was prepared into a solution with weight percentage of 0.4 wt %, and 0.015 wt % of polyethyleneimine and 0.04 wt % of ammonium persulfate were added to the solution to obtain the fracturing fluid after thorough stirring.

Figure 2:
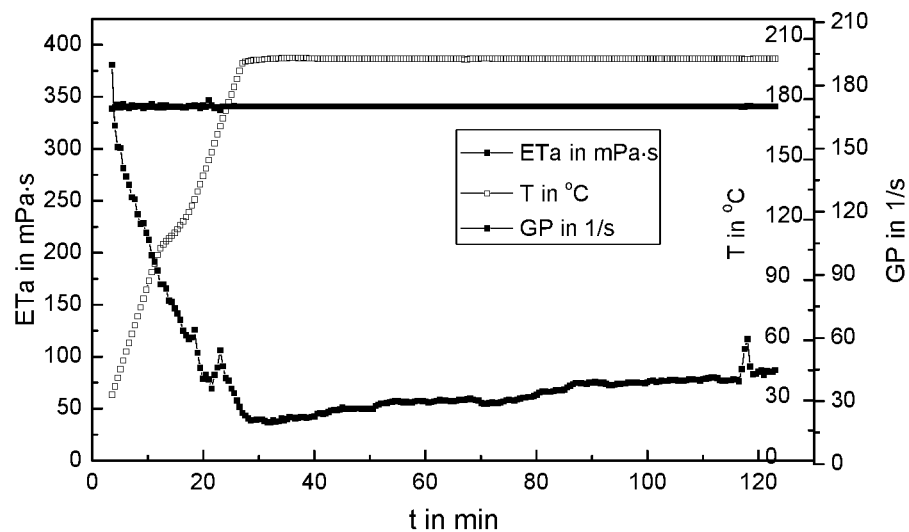
FIG. 2 is a variation curve of the apparent viscosity of the ultra-high temperature fracturing fluid system vs time at 170 s$^{-1}$ and 200° C.

The variation curve of the apparent viscosity of the ultra-high temperature fracturing fluid system over time was tested at 170 s$^{-1}$ and 200° C., as shown in FIG. 2. It can be seen from FIG. 2, the apparent viscosity of the high temperature fracturing fluid decreases sharply when the temperature increases. When it reaches 200° C., the viscosity is 45 mPa·s, after which, the viscosity rises slowly. Shear continues to be performed to 120 minutes at 200° C., and the viscosity of the high temperature fracturing fluid rises gradually, and the viscosity of the solution reaches 80 mPa·s, indicating that the ultra-high temperature fracturing fluid of the present invention is self-healed, thereby increasing the viscosity of the fracturing fluid system.

Embodiment 3

In this embodiment, five monomers of acrylamide, acrylic acid, 2-acrylamido-2-methylpropanesulfonic acid, sodium p-styrenesulfonate and [2-(Methacryloyloxy)ethyl]trimethylammonium chloride were polymerized in a weight ratio of 65:17:15:2.0:1.0 at 30° C. for 10 hours to obtain a copolymer, the copolymer was crushed, and then dried at 40° C., and finally pulverized to 20 0 mesh to obtain a polymer thickener powder. The polymer thickener was prepared into a solution with weight percentage of 0.6 wt %, and 0.02 wt % of polyethyleneimine and 0.06 wt % of ammonium persulfate capsule were added to the solution to obtain the fracturing fluid after thorough stirring.

Figure 3:
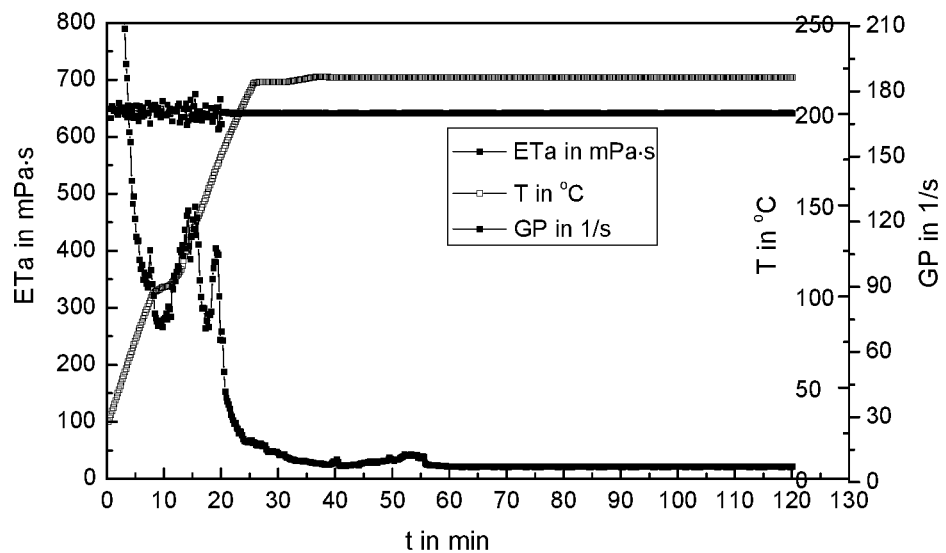
FIG. 3 is a variation curve of the apparent viscosity of the ultra-high temperature fracturing fluid system vs time at 170 s$^{-1}$ and 220° C.

The variation curve of the apparent viscosity of the ultra-high temperature fracturing fluid system over time was tested at 170 s$^{-1}$ and 220° C., as shown in FIG. 3. It can be seen from FIG. 3, the apparent viscosity of the high temperature fracturing fluid decreases sharply when the temperature increases. When it reaches 220° C., the viscosity is 34 mPa·s. Shear continues to be performed to 120 minutes at 220° C., and the viscosity is maintained at approximately 34 mPa·s, indicating that the thermal destruction of the thickener and the repair of the polyethyleneimine and the thickener achieve a dynamic equilibrium at this point. Therefore, the maximum temperature of the ultra-high temperature fracturing fluid of the present invention is 220° C. at 170 s$^{-1}$.

Embodiment 4

In this embodiment, six monomers of acrylamide, acrylic acid, 2-acrylamido-2-methylpropanesulfonic acid, N-vinyl-2-pyrrolidone, sodium p-styrenesulfonate, and dimethyloctadecyl allyl ammonium chloride were polymerized in a weight ratio of 65:17:15:1.0:1.0:1.0 at 40° C. for 8 hours to obtain a copolymer, the copolymer was crushed, and then dried at 40° C., and finally pulverized to 250 mesh to obtain a polymer thickener powder. The polymer thickener is prepared into a solution with weight percentage of 0.6 wt %, and 0.015 wt % of polyethyleneimine and 0.04 wt % of ammonium persulfate were added to the solution to obtain the fracturing fluid after thorough stirring.

Figure 4:
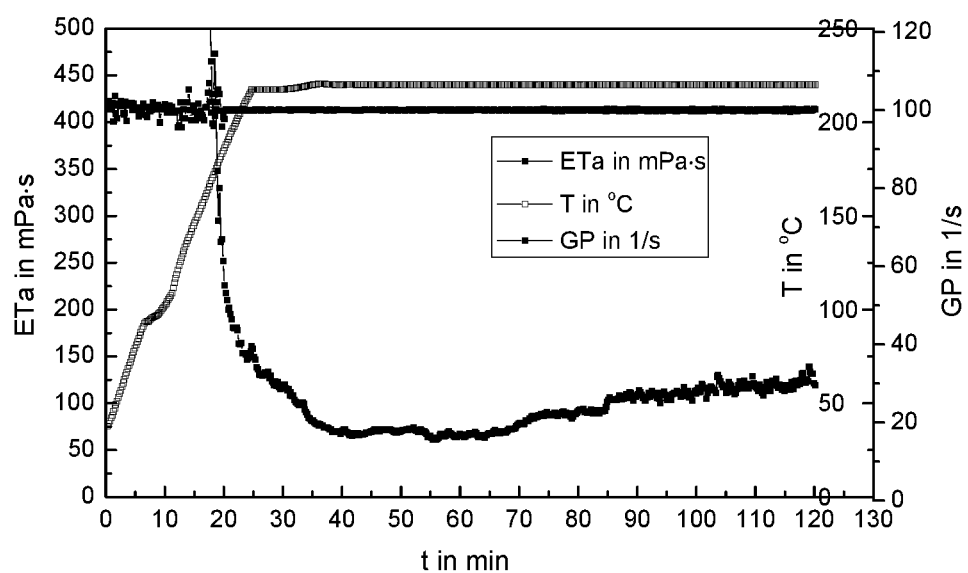
FIG. 4 is a variation curve of the apparent viscosity of the ultra-high temperature fracturing fluid system vs time at 100 s$^{-1}$ and 220° C.

The variation curve of the apparent viscosity of the ultra-high temperature fracturing fluid system over time was tested at 100 s$^{-1}$ and 220° C., as shown in FIG. 4. It can be seen form FIG. 4, the apparent viscosity of the high temperature fracturing fluid decreases sharply when the temperature increases, and the lowest viscosity drops to 65 mPa·s. Shear continues to be performed to 120 minutes at 220° C., and the viscosity of the high temperature fracturing fluid rises slowly and the viscosity of the solution reaches 120 mPa·s, which indicates that the ultra-high temperature fracturing fluid of the present invention is self-healed, thereby increasing the viscosity of the fracturing fluid system.

Embodiment 5

In this embodiment, six monomers of acrylamide, acrylic acid, 2-acrylamido-2-methylpropanesulfonic acid, N-vinyl- 2-pyrrolidone, dimethydiallyllammonium chloride and dimethyl octadecyl allyl ammonium chloride were polymerized in a weight ratio of 65:17:15:2.0:0.5:0.5 at 30° C. for 10 hours to obtain a copolymer, the copolymer was crushed, and then dried at 40° C., and finally pulverized to 250 mesh to obtain a polymer thickener powder. The polymer thickener was prepared into a solution with weight percentage of 0.6 wt %, and 0.015 wt % of polyethyleneimine and 0.04 wt % of ammonium persulfate were added to the solution to obtain the fracturing fluid after thorough stirring.

Figure 5:
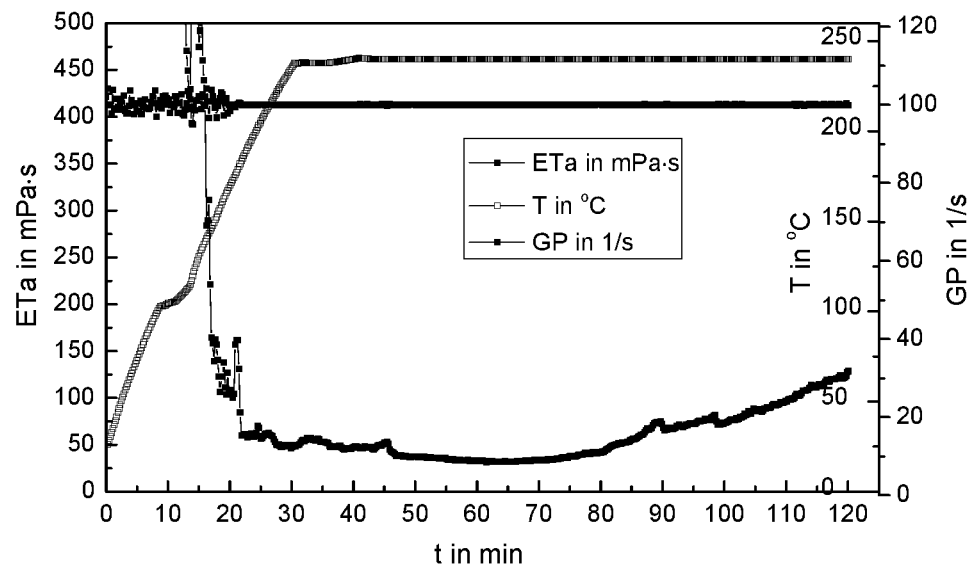
FIG. 5 is a variation curve of the apparent viscosity of the ultra-high temperature fracturing fluid system vs time at 100 s$^{-1}$ and 240° C.

The variation curve of the apparent viscosity of the ultra-high temperature fracturing fluid system over time was tested at 100 $s^{-1}$ and 240° C., as shown in FIG. 5. It can be seen from FIG. 5, the apparent viscosity of the high temperature fracturing fluid decreases sharply when the temperature increases, and the lowest viscosity drops to 51 mPa·s. Shear continues to be performed to 120 minutes at 240° C., and the viscosity of the high temperature fracturing fluid rises slowly and the viscosity of the solution reaches 124 mPa·s, indicating that the ultra-high temperature fracturing fluid of the present invention is self-healed, thereby increasing the viscosity of the fracturing fluid system.

Embodiment 6

In this embodiment, five monomers of acrylamide, acrylic acid, 2-acrylamido-2-methylpropanesulfonic acid, N-vinyl-2-pyrrolidone and dimethyl octadecyl allyl ammonium chloride were polymerized in a weight ratio of 65:17:15:2.0:1.0 at 30° C. for 10 hours to obtain a copolymer, the copolymer was crushed, and then dried at 40° C., and finally pulverized to 250 mesh to obtain a polymer thickener powder. The polymer thickener was prepared into a solution with weight percentage of 0.6 wt %, and 0.015 wt % of polyethyleneimine, 0.02 wt % of ammonium persulfate capsule and 0.02 wt % of ammonium persulfate were added to the solution to obtain the fracturing fluid after thorough stirring.

Figure 6:
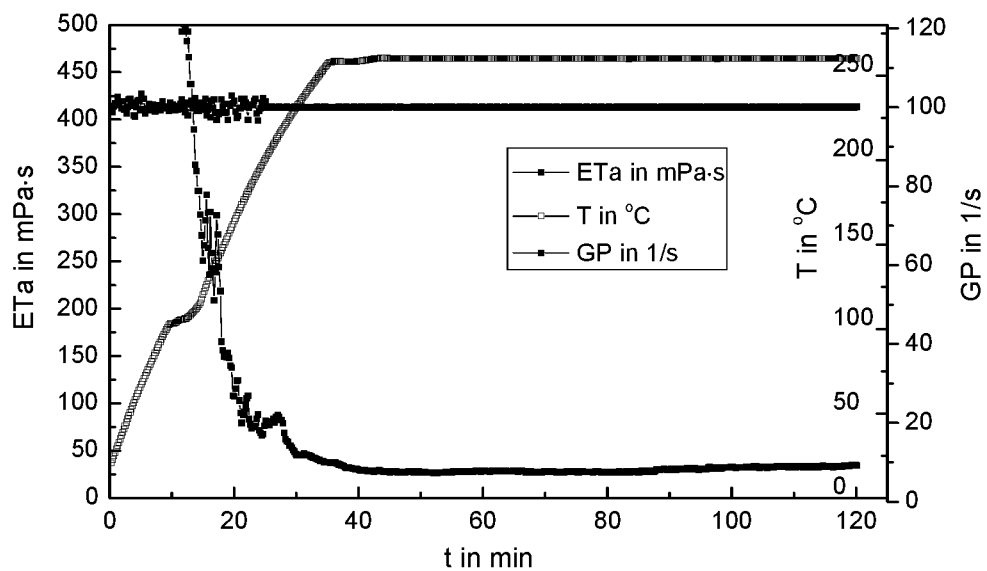
FIG. 6 is a variation curve of the apparent viscosity of the ultra-high temperature fracturing fluid system vs time of 100 s$^{-1}$ and 260° C.

The variation curve of the apparent viscosity of the ultra-high temperature fracturing fluid system over time was tested at 100 $s^{-1}$ and 260° C., as shown in FIG. 6. It can be seen from FIG. 6, the apparent viscosity of the high temperature fracturing fluid decreases sharply when the temperature increases. When it reaches 260° C., the viscosity is 30 mPa·s. Shear continues to be performed to 120 minutes at 260° C., and the viscosity is maintained at approximate 35 mPa·s, indicating that the thermal destruction of the thickener and the repair of the polyethyleneimine and the thickener achieve a dynamic equilibrium at this point. Therefore, the maximum temperature of ultra-high temperature fracturing fluid of the present invention is 260° C. at 100 $s^{-1}$.

Figure 7:
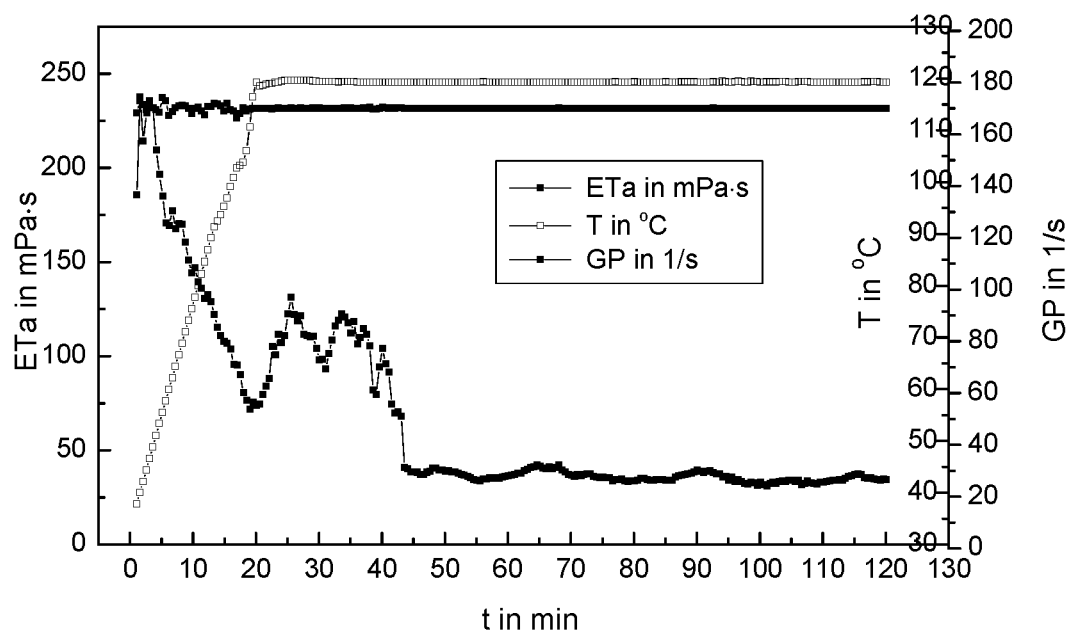
FIG. 7 is a variation curve of apparent viscosity of the guar gum fracturing fluid system vs time at 170 s$^{-1}$ and 120° C.

Control Group 0.5 wt % of guar gum solution was prepared, 0.3-0.4 wt % of organ-borate cross-linking agent, 0.02 wt % of ammonium persulfate capsule and 0.02 wt % of ammonium persulfate were added to the guar gum solution, and then stirred thoroughly to obtain a fracturing fluid. The variation curve of the apparent viscosity of the guar gum fracturing fluid system over time was tested at 170 $s^{-1}$ and 120° C., as shown in FIG. 7. It can be seen from FIG. 7, the apparent viscosity of the high temperature fracturing fluid decreases sharply when the temperature increases. When it reaches 120° C., the viscosity drops to 70 mPa·s. Shear continues to be performed at 120° C., and the viscosity of the fracturing fluid increases slowly and the viscosity of the solution reaches 132 mPa·s, which is caused by the delayed cross-linking of the cross-linking agent. Then the viscosity of the fracturing fluid begins to decrease and eventually maintains at approximate 34 mPa·s, which indicates that the structure of the guar gum fracturing fluid system is destroyed under the thermal shearing action, so the fracturing fluid cannot be applied in reservoirs with temperatures exceeding 120° C.

Although specific embodiments of the present invention have been described in detail, it should not be construed as a limitation on the scope of the patent. Within the scope of the claims, various modifications and alterations made by those skilled in the art without creative labor still belong to the protection scope of the present invention.

What is claimed is:

1. A fluid, comprising the following components in mass percentages:
   0.4 wt %-0.8 wt % of a polymer thickener,
   0.015 wt %-0.02 wt % of a non-metallic crosslinking agent,
   0.04 wt %-0.06 wt % of a gel breaker, and
   rest of the fluid is water;
   wherein the polymer thickener is obtained by a polymerization of acrylamide, acrylic acid, 2-acrylamido-2-methylpropanesulfonic acid, rigid monomer and cationic hydrophobic monomer in a weight ratio of 55-70:15-20:15-20:0.5-3:0.1-1.0;
   wherein the gel breaker is an ammonium persulfate capsule and/or ammonium persulfate; and
   wherein the rigid monomer is N-vinyl-2-pyrrolidone and/or sodium p-styrenesulfonate.

2. The fluid according to claim 1, wherein the fluid comprises the following components in mass percentages: 0.6 wt % of the polymeric thickener, 0.015 wt % of the non-metallic crosslinking agent, 0.04 wt % of the gel breaker, and the rest of the fluid is water.

3. The fluid according to claim 2, wherein the non-metallic crosslinking agent is polyethyleneimine.

4. The fluid according to claim 1, wherein the non-metallic crosslinking agent is polyethyleneimine.

5. The fluid according to claim 1, wherein the cationic hydrophobic monomer is at least one selected from the group consisting of dimethydiallyllammonium chloride, [2-(Methacryloyloxy)ethyl]trimethylammonium chloride and dimethyl octadecyl allyl ammonium chloride.

6. The fluid according to claim 1, wherein the polymer thickener is prepared by the following method: acrylamide, acrylic acid, 2-acrylamido-2-methylpropanesulfonic acid, rigid monomers and cationic hydrophobic monomers are mixed and polymerized at a temperature of 30-40° C. for 8-10 hours to obtain a copolymer; then the copolymer is crushed, dried and finally pulverized.

7. A method of fracturing stimulation of ultra-high temperature wells, the method comprising:
   using a fluid in the fracturing stimulation of ultra-high temperature wells at temperatures of 180-260° C., wherein the fluid comprises the following components in mass percentages:
   0.4 wt %-0.8 wt % of a polymer thickener,
   0.015 wt %-0.02 wt % of a non-metallic crosslinking agent,
   0.04 wt %-0.06 wt % of a gel breaker, and
   rest of the fluid is water;
   wherein the polymer thickener is obtained by a polymerization of acrylamide, acrylic acid, 2-acrylamido-2-methylpropanesulfonic acid, rigid monomer and cationic hydrophobic monomer in a weight ratio of 55-70:15-20:15-20:0.5-3:0.1-1.0;
   wherein the gel breaker is an ammonium persulfate capsule and/or ammonium persulfate; and wherein the rigid monomer is N-vinyl-2-pyrrolidone and/or sodium p-styrenesulfonate.

8. The method of fracturing stimulation of ultra-high temperature wells according to claim 7, wherein the fluid comprises the following components in mass percentages: 0.6 wt % of the polymeric thickener, 0.015 wt % of the non-metallic crosslinking agent, 0.04 wt % of the gel breaker, and the rest of the fluid is water.

9. The method of fracturing stimulation of ultra-high temperature wells according to claim 7, wherein the non-metallic crosslinking agent is polyethyleneimine.

10. The method of fracturing stimulation of ultra-high temperature wells according to claim 7, wherein the cationic hydrophobic monomer is at least one selected from the group consisting of dimethydiallyllammonium chloride, [2-(Methacryloyloxy)ethyl]trimethylammonium chloride and dimethyl octadecyl allyl ammonium chloride.

11. The method of fracturing stimulation of ultra-high temperature wells according to claim 7, wherein the polymer thickener is prepared by the following method: acrylamide, acrylic acid, 2-acrylamido-2-methylpropanesulfonic acid, rigid monomers and cationic hydrophobic monomers are mixed and polymerized at a temperature of 30-40° C. for 8-10 hours to obtain a copolymer; then the copolymer is crushed, dried and finally pulverized.

* * * * *